United States Patent
Choi et al.

(10) Patent No.: US 9,806,755 B2
(45) Date of Patent: Oct. 31, 2017

(54) PROTECTIVE COVER AND ELECTRONIC DEVICE HAVING THE SAME

(71) Applicant: Samsung Electronics Co., Ltd., Gyeonngi-do (KR)

(72) Inventors: Moon-Seok Choi, Gyeonggi-do (KR); Chang-Hwan Lee, Gyeonggi-do (KR); Jin-Woo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 39 days.

(21) Appl. No.: 14/737,125

(22) Filed: Jun. 11, 2015

(65) Prior Publication Data

US 2015/0365124 A1 Dec. 17, 2015

(30) Foreign Application Priority Data

Jun. 11, 2014 (KR) ........................ 10-2014-0071023

(51) Int. Cl.
| | | |
|---|---|---|
| *H04M 1/00* | (2006.01) | |
| *H04B 1/3888* | (2015.01) | |
| *H04B 1/3877* | (2015.01) | |
| *H04M 1/18* | (2006.01) | |
| *H04M 1/02* | (2006.01) | |

(52) U.S. Cl.
CPC ......... *H04B 1/3888* (2013.01); *H04B 1/3877* (2013.01); *H04M 1/185* (2013.01); *H04M 1/0283* (2013.01)

(58) Field of Classification Search
CPC . H04B 1/3877; H04B 1/3888; H04M 1/0283; H04M 1/185; H04M 1/04

USPC ......... 455/575.1, 875.8; 379/433.01, 433.11, 379/433.13
See application file for complete search history.

(56) References Cited

U.S. PATENT DOCUMENTS

| | | | | |
|---|---|---|---|---|
| 7,006,853 | B2* | 2/2006 | Kang | H04M 1/0212 |
| | | | | 455/550.1 |
| 8,256,804 | B2* | 9/2012 | Yang | G11B 33/027 |
| | | | | 292/102 |
| 8,344,836 | B2 | 1/2013 | Lauder et al. | |
| 8,526,180 | B2* | 9/2013 | Rayner | G06F 1/1626 |
| | | | | 206/320 |
| 2003/0003949 | A1* | 1/2003 | Park | H01M 2/1066 |
| | | | | 455/550.1 |
| 2004/0192418 | A1* | 9/2004 | Nam | H01M 2/1022 |
| | | | | 455/575.1 |
| 2005/0266892 | A1* | 12/2005 | Schrack | H04M 1/03 |
| | | | | 455/569.1 |
| 2006/0160586 | A1* | 7/2006 | Cheng | H04M 1/0283 |
| | | | | 455/575.8 |
| 2007/0135163 | A1* | 6/2007 | Lee | H04B 1/385 |
| | | | | 455/557 |

(Continued)

FOREIGN PATENT DOCUMENTS

| | | |
|---|---|---|
| KR | 10-2009-0116597 | 11/2009 |
| KR | 10-2011-0086296 | 7/2011 |

*Primary Examiner* — Keith Fang
*Assistant Examiner* — B. M. M. Hannan
(74) *Attorney, Agent, or Firm* — The Farrell Law Firm, P.C.

(57) ABSTRACT

A protective cover for an electronic device is provided. The electronic device includes a protective cover configured to protect at least a partial region of the electronic device. The protective cover is detachably connectable with the electronic device by a snap-fit structure provided on at least one portion in surface contact with the electronic device.

14 Claims, 13 Drawing Sheets

(56) References Cited

U.S. PATENT DOCUMENTS

| | | | | |
|---|---|---|---|---|
| 2010/0084874 A1* | 4/2010 | Yiming | .............. | E05B 17/0037 |
| | | | | 292/113 |
| 2010/0253187 A1* | 10/2010 | Yang | ................... | G11B 33/027 |
| | | | | 312/223.1 |
| 2012/0182673 A1* | 7/2012 | Wang | ....................... | H01H 3/12 |
| | | | | 361/679.01 |
| 2014/0216954 A1* | 8/2014 | Law | ......................... | A45F 5/02 |
| | | | | 206/45.23 |
| 2014/0221058 A1* | 8/2014 | Jand | ...................... | A45C 11/00 |
| | | | | 455/575.8 |
| 2014/0317863 A1* | 10/2014 | Beermeunder | .......... | B25F 1/00 |
| | | | | 224/191 |
| 2015/0122850 A1* | 5/2015 | Quehl | ................... | A45C 11/00 |
| | | | | 224/191 |
| 2015/0288405 A1* | 10/2015 | Gygax | ................... | H04M 1/04 |
| | | | | 455/575.1 |

* cited by examiner ped # PROTECTIVE COVER AND ELECTRONIC DEVICE HAVING THE SAME

PRIORITY

This application claims priority under 35 U.S.C. §119(a) to a Korean Patent Application filed in the Korean Intellectual Property Office on Jun. 11, 2014, and assigned Serial No. 10-2014-0071023, the contents of which are incorporated herein by reference.

BACKGROUND OF THE INVENTION

1. Field of the Invention

Various embodiments of the present invention relate generally to an electronic device and, for more particularly, to an electronic device including a protective cover.

2. Description of the Related Art

Generally, electronic devices include protective covers to protect at least partial regions of the electronic device. Such protective covers may be detachable from the electronic devices, and protect at least partial regions among front surfaces and/or rear surfaces of the electronic devices. Because electronic devices are frequently carried, electronic devices suffer impacts, such as drops, and often suffer damage to the outer surfaces, such as scratches. Therefore, it is advantageous that electronic devices are protected by the protective covers.

Particularly, when not being used, electronic devices such as smart phones or tablet Personal Computers (PCs) can be protected by the aforementioned protective covers, since these types of electronic devices arrange displays (e.g., touch screen devices) on front surfaces thereof. Protective covers on such devices can function as accessories, since they are often constructed in various colors, material, textures, and designs. Further, the protective covers are often capable of serving the additional role of holding the electronic devices at various angles, thereby increasing a scope of utilization.

To be effective, the protective cover and the electronic device should be firmly fixed to each other. Therefore, the protective cover and the electronic device should not be released arbitrarily during carrying, and should smoothly perform an attachment/detachment operation intended by a user.

Generally, an electronic device can be fixed to a protective cover in such a manner that the electronic device is fitted and locked to a locking fragment extending upward from an edge (e.g., four corners) of the protective cover. However, because a separate locking fragment is configured to be exposed to the external surface of the protective cover, appearance may be compromised. Additionally, frequent fitting operations of the electronic device leads to damage of the locking fragment of the protective cover and results in a failure of the use of the protective cover.

SUMMARY

The present invention has been made to address at least the problems and disadvantages described above, and to provide at least the advantages described below.

Accordingly, an aspect of the present invention is to provide a protective cover and an electronic device having the same, capable of being implemented to provide an aesthetically pleasing appearance.

Accordingly, an aspect of the present invention is to provide a protective cover and an electronic device having the same, implemented to promote firm attachment of the protective cover to the electronic device and easy attachment/detachment.

Accordingly, another aspect of the present invention is to provide a protective cover and an electronic device having the same, implemented to construct a combination structure of the protective cover and the electronic device such that the combination structure does not protrude from an external surface of the electronic device, thereby preventing an increase of a volume or bulk of the electronic device.

Accordingly, another aspect of the present invention is to provide a protective cover and an electronic device having the same, capable of being implemented to facilitate maintenance of a combination structure that may be damaged due to frequent attachment/detachment of the electronic device.

In accordance with an aspect of the present invention, a protective cover for an electronic device is provided. The electronic device includes a protective cover configured to protect at least a partial region of the electronic device. The protective cover is detachably connectable with the electronic device by a snap-fit structure provided on at least one portion in surface contact with the electronic device.

In accordance with an aspect of the present invention, a protective cover for an electronic device includes at least one cover member. The protective cover is detachably connected to the electronic device to protect at least a partial region of the structure, the protective cover being connected to the at least a partial region of the electronic device by a snap-fit structure, such that at least one portion of the at least one cover member is in surface contact with the electronic device.

In accordance with an aspect of the present invention, an electronic device having a detachable protective cover is provided. The electronic device includes a push hook protruding from at least one portion of the protective cover, and a locker unit arranged on the electronic device at a position corresponding to the push hook in surface contact with the protective cover, the locker unit housing a protrusion part of the push hook by a snap-fit structure. The protective cover includes at least one rigid member, and the push hook includes a screw hole, and is fixed in such a manner that a screw attaches the push hook to the rigid member through a screw bushing insert molded to the rigid member after passing through the screw hole. The locker unit includes a housing having a button housing space arranged in a portion of the electronic device at a position corresponding to the push hook, a push button flexibly arranged in the button housing space of the housing, and an elastic member providing pressure on the push button towards an outer side of the electronic device. The protrusion part of the push hook is located in a space of the housing under pressure applied by the push button and locked to a locking jaw of the housing.

BRIEF DESCRIPTION OF THE DRAWINGS

The above and other aspects, features and advantages of the present invention will become more apparent from the following detailed description, taken in conjunction with the accompanying drawings in which.

DETAILED DESCRIPTION OF THE EMBODIMENTS OF THE PRESENT INVENTION

Figure 1:
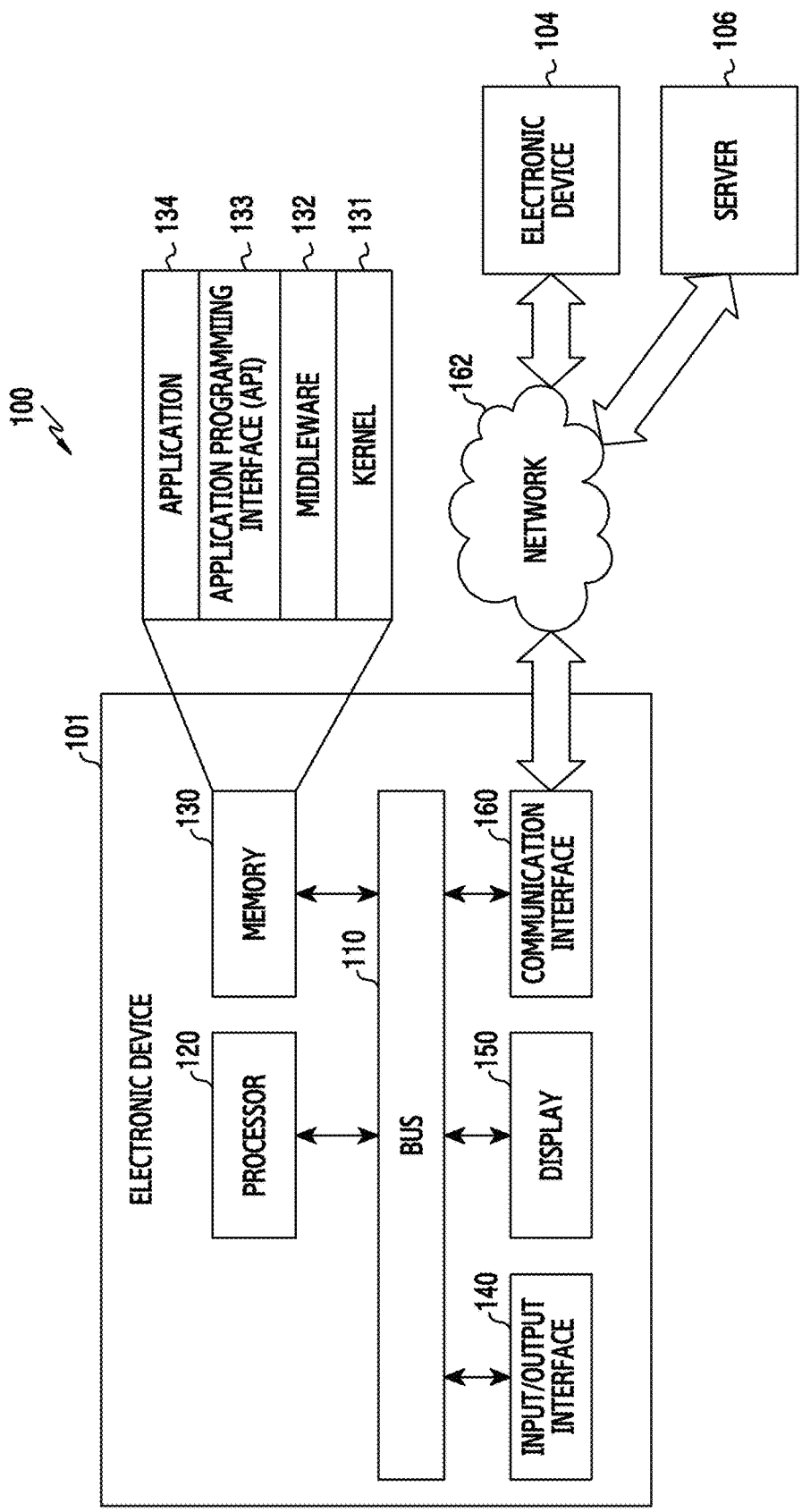
FIG. 1 is a diagram illustrating a network environment including an electronic device, according to an embodiment of the present invention.

Hereinafter, various embodiments of the present invention are described with reference to the accompanying drawings. While the various embodiments of the present inventions are susceptible to various modifications and alternative forms, a specific embodiment thereof has been shown by way of example in the drawings and will herein be described in detail. It should be understood, however, that such description is not intended to limit the various embodiments of the present invention to the particular forms disclosed, but, on the contrary, the various embodiments of the present invention are intended to cover all modifications, equivalents, and alternatives falling within the spirit and scope of the present invention. Like reference numerals denote like elements throughout the drawings.

The terms "include" and "may include", as used in the present disclosure, are intended to indicate the presence of a corresponding function, operation, or element disclosed thereafter, and is not intended to limit the presence of one or more functions, operations, or elements. In addition the terms "include" and "have" are intended to indicate that the characteristics, numbers, steps, operations, and elements disclosed or the combinations thereof exist. As such, it should be understood that the terms "include" and "have", as used herein, are not intended to limit the present invention to the characteristics, numbers, steps, operations, and elements disclosed, but that there may be additional possibilities of one or more other characteristics, numbers, steps, operations, and combinations thereof.

As used herein, the expression "or" includes any and all combinations of words enumerated together. For example, "A or B" may include A or B, or may include both of A and B.

Although expressions used in the present disclosure, such as "$1^{st}$", "$2^{nd}$", "first", "second", may be used to express various elements of the various embodiments, these terms are not intended to limit the corresponding elements. For example, the above expressions are not intended to limit an order or an importance of the corresponding elements. The above expressions may be used to distinguish one element from another element. For example, a first user device and a second user device are both user devices, and indicate different user devices. For example, a first element may be referred to as a second element, and similarly, a second element may be referred to as a first element without departing from the scope of the present invention.

When an element is mentioned as being "connected" to or "accessed" by another element, it should be understood that not only may the element be directly connected to or accessed by the other element, but it is to be understood that there may also be intervening elements present between the two elements. On the other hand, when an element is mentioned as being "directly connected" to or "directly accessed" by another element, it is to be understood that there are no intervening elements present between the two elements.

By the use of the term "substantially" herein, it is meant that the recited characteristic, parameter, or value need not be achieved exactly, but that deviations or variations, including but in no way limited to, for example, tolerances, measurement error, measurement accuracy limitations, and other factors known to persons of ordinary skill in the art, may occur in amounts that do not preclude the effect the characteristic was intended to provide.

The terminology used in the present disclosure is merely for the purpose of describing particular embodiments and is not intended to be limiting of the various embodiments of the present invention. A singular expression includes a plural expression unless there is a contextually distinctive difference therebetween.

Unless otherwise defined, all terms, including technical and scientific terms, used herein have the same meaning as commonly understood by those ordinarily skilled in the art to which the various embodiments of the present invention belong. It will be further understood that the terms, such as those defined in commonly used dictionaries, should be interpreted as having meanings that are consistent with their meanings in the context of the relevant field of art, and are not to be interpreted in an idealized or overly formal sense unless expressly so defined herein.

An electronic device, according to various embodiments of the present invention, may be a device including an antenna, capable of performing a communication function in at least one frequency band. For example, the electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, and a wearable device (e.g., a Head-Mounted-Device (HMD), such as electronic glasses, electronic clothes, an electronic bracelet, an electronic necklace, an electronic appcessory, an electronic tattoo, or a smart watch).

According to certain embodiments, the electronic device may be a smart home appliance having an antenna. For example, the smart home appliance may include at least one of a TeleVision (TV), a Digital Versatile Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to certain embodiments, the electronic device may be one of various medical devices (e.g., a Magnetic Resonance Angiography (MRA) device, a Magnetic Resonance Imaging (MRI) device, a Computed Tomography (CT) scanner, imaging equipment, an ultrasonic instrument, etc.), a navigation device, a Global Positioning System (GPS) receiver, an Event Data Recorder (EDR), a Flight Data Recorder (FDR), a car infotainment device, an electronic equipment for a ship (e.g., a vessel navigation device, a gyro compass, etc.), avionics, a security device, a car head unit, an industrial or domestic robot, an Automatic Teller's Machine (ATM), and a Point Of Sale (POS) machine.

According to certain embodiments, the electronic device may be part of at least one of an item of furniture or a building/structure. The electronic device may be an electronic board, an electronic signature input device, a projector, or any of various measurement machines (e.g., water supply, electricity, gas, and propagation measurement machines, etc.).

The electronic device may be one or more combinations of the aforementioned various devices. In addition, the electronic device may be a flexible device. Moreover, the electronic device is not limited to the aforementioned devices.

Hereinafter, an electronic device according to various exemplary embodiments will be described with reference to the accompanying drawings. As used herein, the term 'user' refers to a person who uses the electronic device or a device which uses the electronic device (e.g., an Artificial Intelligence (AI) electronic device).

FIG. 1 is a diagram illustrating a network environment including an electronic device, according to an embodiment of the present invention.

Referring to FIG. 1 a network environment 100 including an electronic device 101 is provided. The electronic device 101 includes a bus 110, a processor 120, a memory 130, an input/output interface 140, a display 150, and a communication interface 160.

The bus 110 is a circuit for connecting the aforementioned elements to each other and for delivering communication (e.g., a control message) between the elements.

The processor 120 receives an instruction from the aforementioned elements (e.g., the memory 130, the input/output interface 140, the display 150, and the communication interface 160.), via the bus 110, and interprets the received instruction and performs a calculation or processes data according to the interpreted instruction.

The memory 130 stores an instruction or data received from the processor 120 or other elements (e.g., the input/output interface 140, the display 150, and the communication interface 160) or generated by the processor 120 or the other elements. The memory 130 includes programming modules such as a kernel 131, middleware 132, an Application Programming Interface (API) 133, and an application 134. Each of the aforementioned programming modules may consist of software, firmware, or hardware entities or may consist of at least two or more combinations thereof.

The kernel 131 controls or manages system resources (e.g., the bus 110, the processor 120, and the memory 130) used to execute an operation or function implemented in the other programming modules, for example, the middleware 132, the API 133, or the application 134. In addition, the kernel 131 may provide an interface by which the middleware 132, the API 133, or the application 134 may use to access the individual elements of the electronic device 101 to control and manage the individual elements.

The middleware 132 performs a mediation role so that the API 133 or the application 134 communicates with the kernel 131 to exchange data. In addition, regarding task requests received from the application 134, for example, the middleware 132 performs a control (e.g., scheduling or load balancing) for the task requests by using a method of assigning a priority for using a system resource (e.g., the bus 110, the processor 120, the memory 130, etc.) of the electronic device 101 to the application 134.

The API 133 includes at least one interface or function (e.g., instruction) for file control, window control, video processing, character control, and the like. The interface is used by the application 134 to control a function provided by the kernel 131 or the middleware 132.

The application 134 may include an Short Message Service (SMS)/Multimedia Messaging Service (MMS) application, an e-mail application, a calendar application, an alarm application, a health care application (e.g., an application for measuring a physical activity level, a blood sugar, etc.) or an environment information application (e.g., atmospheric pressure, humidity, or temperature information). Additionally or alternatively, the application 134 may be an application related to an information exchange between the electronic device 101 and an external electronic device 104 or server 106. The application 134 related to the information exchange may include, for example, a notification relay application for relaying specific information to the external electronic device 104 or a device management application for managing the external electronic device 104.

For example, the notification relay application includes a function of relaying notification information generated in another application (e.g., an SMS/MMS application, an e-mail application, a health care application, an environment information application, etc.) of the electronic device 101 to the external electronic device 104. Additionally or alternatively, the notification relay application may receive notification information, for example, from the external electronic device 104 and may provide it to the user.

The device management application manages a function for at least one part of the external electronic device 104 which communicates with the electronic device 101. For example, turning on/turning off the external electronic device 104 (or some components thereof), adjusting a display illumination (or a resolution) of the electronic device 104, and managing (e.g., installing, deleting, or updating) an application which operates in the external electronic device 104 or a service (e.g., a call service or a message service) provided by the external electronic device 104.

The application 134 may include an application specified according to attribute information (e.g., an electronic device type) of the external electronic device 104. For example, if the external electronic device 104 is an MP3 player, the application 134 may include an application related to a playing music. Similarly, if the external electronic device 104 is a mobile medical device, the application 134 may include an application related to health care. The application 134 may include at least one of a specified application in the electronic device 101 or an application received from the external electronic device 104.

The input/output interface 140 relays an instruction or data input from a user by using a sensor (e.g., an acceleration sensor, a gyro sensor) or an input device (e.g., a keyboard or a touch screen) to the processor 120, the memory 130, or the communication interface 160 via the bus 110. For example, the input/output interface 140 may provide data regarding a user's touch input via the touch screen to the processor 120. In addition, the input/output interface 140 outputs an instruction or data received from the processor 120, the memory 130, or the communication interface 160 to an output device (e.g., a speaker or a display) via the bus 110. For example, the input/output interface 140 may output audio data provided by using the processor 120 to the user via the speaker.

The display 150 displays a variety of information (e.g., multimedia data or text data) to the user.

The communication interface 160 connects a communication between the electronic device 101 and an external device 104 or the server 106. The communication interface 160 may include an antenna 230, examples of which are described hereinafter. For example, the communication interface 160 may communicate with the external device 104 by being connected with a network 162 through wireless communication or wired communication.

The wireless communication includes, for example, at least one of Wi-Fi, Bluetooth (BT), Near Field Communication (NFC), Global Positioning System (GPS), and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM), etc.).

The wired communication includes, for example, at least one of Universal Serial Bus (USB), High Definition Multimedia Interface (HDMI), Recommended Standard (RS)-232, and Plain Old Telephone Service (POTS).

The network 162 may be a telecommunications network. The telecommunications network may include at least one of a computer network, the Internet, the Internet of Things, and a telephone network.

A protocol (e.g., a transport layer protocol, a data link layer protocol, or a physical layer protocol) for communication between the electronic device 101 and an external device 104 may be supported in at least one of the application 134, the application programming interface 133, the middleware 132, the kernel 131, and the communication interface 160.

Figure 2A:
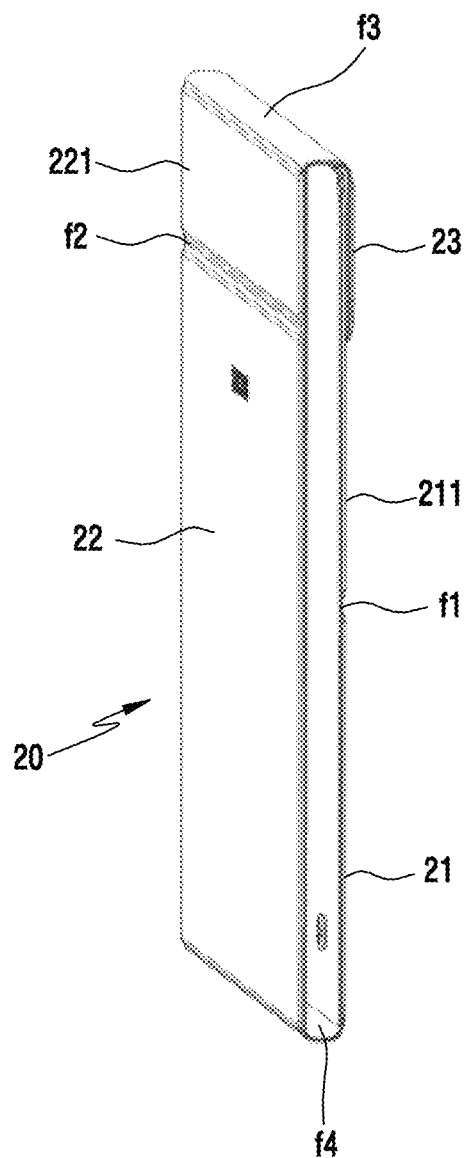
FIG. 2A is a perspective view of a protective cover, according to an embodiment of the present invention.

FIG. 2A is a perspective diagram view of a protective cover 20 according to an embodiment of the present invention.

Referring to FIG. 2A, the protective cover 20 may be formed in such a manner that a plurality of cover members 21, 22, 23, 211, and 221 are connected with one another along a plurality of folding lines f1, f2, f3, and f4. For example, the cover members 21, 22, 23, 211, and 221 may include a first cover member 21, a second cover member 22, a third cover member 23, a fourth cover member 211, and a fifth cover member 221. The cover members 21, 22, 23, 211, and 221 may be connected with one another along the folding lines f1, f2, f3, and f4. The cover members 21, 22, 23, 211, and 221 may be formed in such a manner that a rigid internal member is covered with a soft external member. The rigid internal member may be formed of relatively hard materials. According to one exemplary embodiment, the rigid internal member may be formed of various materials, such as PolyCarbonate (PC), metal materials, etc. The soft external member forms the external appearance of the protective cover 20, and may be formed of various materials such as leather materials, rubber, silicon, cloth, nonwoven fabric, etc.

According to an embodiment, the folding lines f1, f2, f3, and f4 may not include the rigid internal member or may be formed of softer materials than the rigid internal member, and thus, may be folded at certain angles with respect to the cover members 21, 22, 23, 211, and 221. The cover members 21, 22, 23, 211, and 221 protect an electronic device in such a manner of covering the electronic device along the folding lines f1, f2, f3, and f4. The electronic device may be used in a state in which at least some cover members are opened.

Figure 2B:
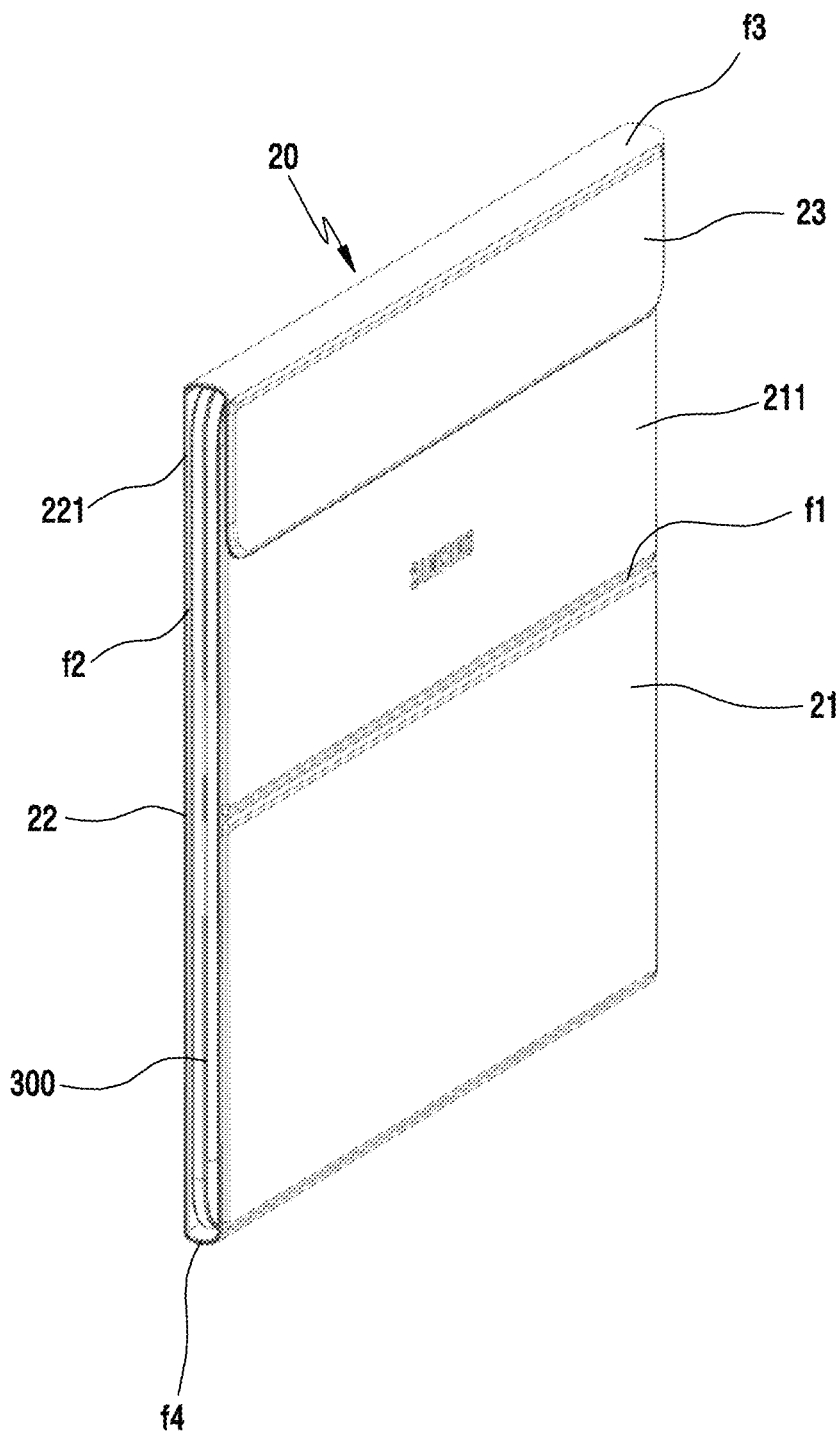
FIG. 2B is a perspective view of a protective cover coupled with an electronic device, according to an embodiment of the present invention.

FIG. 2B is a perspective view of a protective cover 20 coupled with the electronic device, according to an embodiment of the present invention.

Referring to FIG. 2B, the electronic device 300 is protected in such a manner that the electronic device 300 is covered with the cover members 21, 22, 23, 211, and 221 of the protective cover 20. FIG. 2B illustrates the protective cover 20 folded to fully protect the electronic device 300 for easy carrying. That is, the first cover member 21 is coupled with the electronic device 300 by a structure for coupling the protective cover 20 to the electronic device 300 (i.e. a combination structure), to be described with reference to FIG. 3A, and the second cover member 22 is folded along the folding line f4 in a position corresponding to the first cover member 21 and protects a corresponding surface (e.g., a display) of the electronic device 300. The second cover member 22 is connected with the fifth cover member 221 along the folding line f2, and the fifth cover member 221 is connected with the third cover member 23 along the folding line f3. The third cover member 23 is folded in such a manner that the third cover member 23 is overlapped with the fourth cover member 211 that is connected with the first cover member 21 along the folding line f1. In this way, the protective cover 20 may protect the electronic device 300.

Figure 2C:
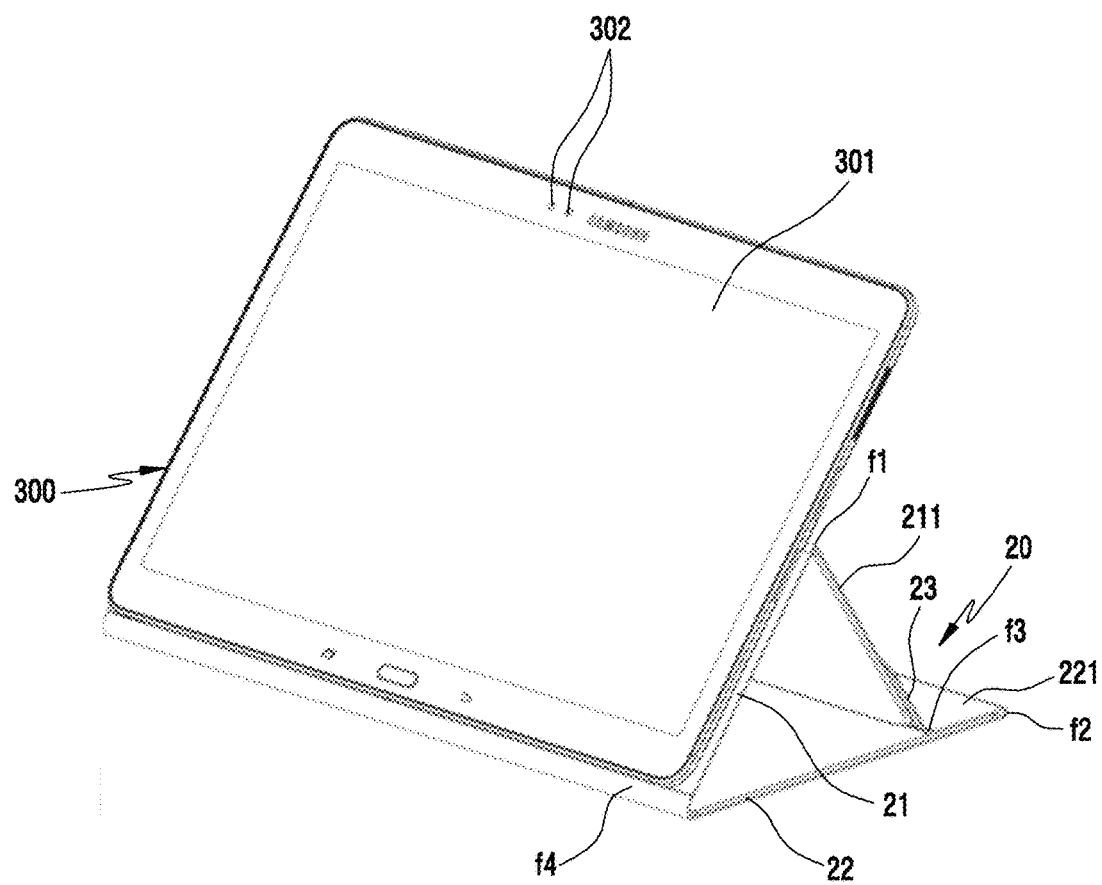
FIG. 2C and FIG. 2D are diagrams illustrating an electronic device held at various angles by a protective cover, according to an embodiment of the present invention.
Figure 2D:
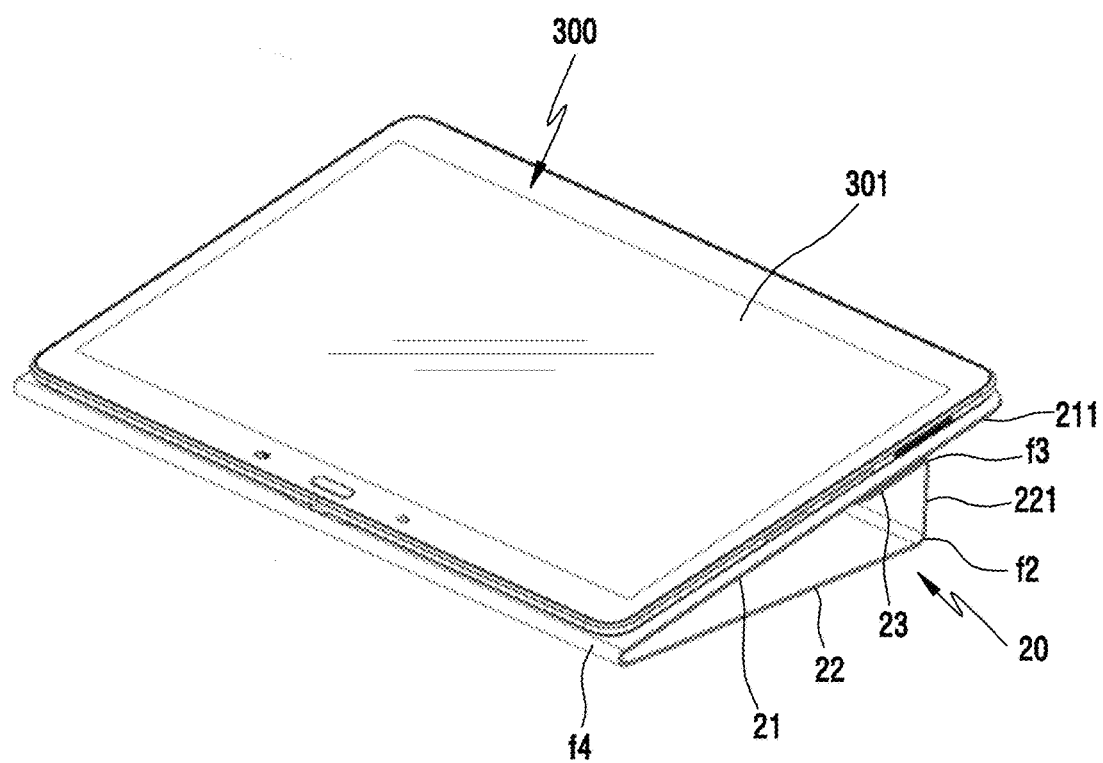

FIG. 2C and FIG. 2D are diagrams illustrating an electronic device held at various angles by a protective cover, according to an embodiment of the present invention.

Referring to FIGS. 2C and 2D, the electronic device 300 is coupled to the first cover member 21 through a snap-fit structure of a push hook 25 (shown in FIG. 3B) and a locking unit 310 (shown in FIG. 5), to be described with reference to FIG. 3A, and the remnant cover members 22, 23, 211 and 221 are opened and mutually supported in various states, thereby being capable of holding the electronic device 300 at various angles.

As illustrated in FIG. 2C, the first cover member 21 supports the electronic device 300, and the second cover member 22 connected with the first cover member 21 is folded in the direction of a rear surface of the electronic device 300 along the folding line f4 and performs the role of a base plate. Also, the fifth cover member 221 and the third cover member 23 are folded to the rear along the folding lines f2 and f3. And, the third cover member 23 contacts at least a portion of the fourth cover member 211 folded to the rear along the folding line f1, in such a manner that the outer surfaces of the third cover member 23 and the fourth cover member 211 are in contact with each other. Accordingly, the electronic device 300 may be held at certain holding angles such that a user may easily use a display 301 and various electronic components 302 of the electronic device 300. For example, electronic components 302 may include a camera module, and various kinds of sensor modules.

As illustrated in FIG. 2D, the first cover member 21 and the fourth cover member 211 support the electronic device 300 without being folded with respect to each other. And, the second cover member 22 connected with the first cover member 21 is folded in the direction of the rear surface of the electronic device 300 along the folding line f4 and performs the role of a base plate. Also, the fifth cover member 221 and the third cover member 23 is folded to the rear along the folding lines f2 and f3, and the third cover member 23 contacts at least a portion of the fourth cover member 211 in such a manner that the outer surfaces of the third cover member 23 and the fourth cover member 211 are in contact with each other. Accordingly, the protective cover 20 holds the electronic device 300 at holding angles smaller than the holding angles of FIG. 2C such that a user may easily make use of a desired function of the electronic device 300.

Figure 3A:
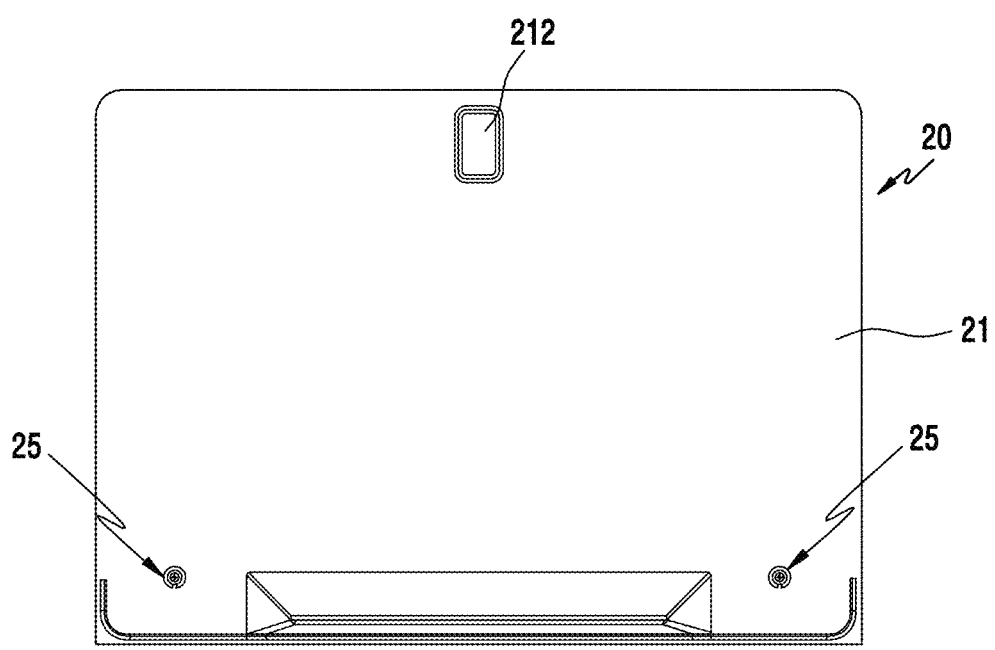
FIG. 3A is a planar view of a protective cover in which a push hook is installed, according to an embodiment of the present invention.

FIG. 3A is a planar view of a protective cover in which a push hook is installed, according to an embodiment of the present invention.

In various embodiments of the present invention, the electronic device 300 and the protective cover 20 may be coupled to or separated from each other by a snap-fit structure.

Referring to FIG. 3A, a snap-fit structure using at least one push hook 25 is provided. The push hook 25 may be disposed in a suitable place of an inner surface of the first cover member 21 of the protective cover 20. The push hook 25 may be fitted and combined to the locking unit 310 (shown in FIG. 5) in such a manner that the push hook 25 is inserted into the locking unit 310 arranged in a corresponding position on the rear surface of the electronic device 300.

The push hook 25 is arranged in such a manner that the push hook 25 protrudes from the cover member 21 of the protective cover 20. And, the locking unit 310 is arranged on the rear surface of the electronic device 300 in a built-in manner and does not protrude out of the electronic device 300. Such an unobtrusive, built-in construction of the locking unit 310 allows the electronic device 300 to retain an aesthetically pleasing appearance.

The combination structure of the push hook 25 and the locking unit 310 is arranged in such a manner that the combination structure is not exposed externally when the electronic device 300 is coupled with the protective cover 20.

As illustrated in FIG. 3A, two combination structures of the push hooks 25 and the locking units 310 are installed at certain intervals, but may also be installed with a different number of combination structures and in different configurations. For instance, two or more combination structures may be arranged in various positions depending on the size and shape of the electronic device 300 and the holding capability of the protective cover 20. For example, if the electronic device 300 is small in size, a single combination structure of the push hook 25 and the locking unit 310 may be applied.

Figure 3B:
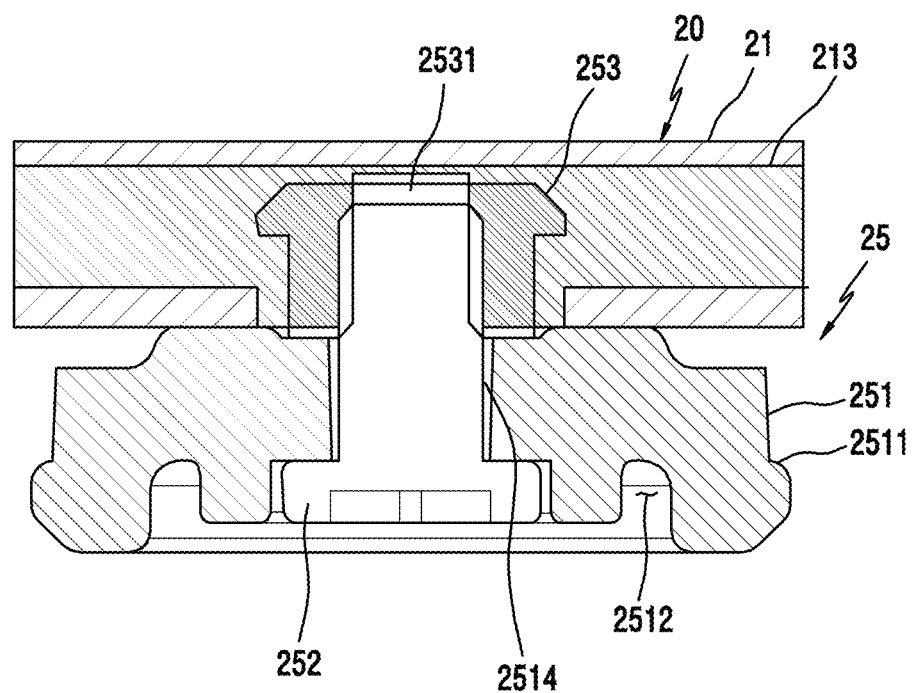
FIG. 3B is a partial cross section view of a push hook coupled with a protective cover, according to an embodiment of the present invention.

FIG. 3B is a partial cross section view of a push hook coupled with a protective cover, according to an embodiment of the present invention.

Referring to FIG. 3B, the push hook 25 arranged to protrude from the first cover member 21 of the protective cover 20 and clamped to the first cover member 21 by means of a screw 252. A screw bushing 253 is insert molded to a rigid internal member 213 of the first cover member 21, and the screw 252 is clamped in such a manner to be screwed into the screw bushing 253 after passing through the push hook 25. The screw bushing 253 may be formed of metal materials, such as brass, and may include screw threads on an internal surface of the screw bushing 253. However, the screw bushing 253 may be formed of various other materials that can be firmly fixed to the first cover member 21 and support a clamping force of the screw 252.

The screw 252 passing through the push hook 25 is clamped to the screw bushing 253 in such a manner that the screw 252 is not protruded from the push hook 25. If the push hook 25 is abraded due to a frequent use of the clamping operation of the push hook 25, the push hook 25 may be easily replaced with a new push hook by simply releasing the screw 252.

The push hook 25 may have a body 251 and a protrusion part 2511 formed along an edge of the body 251. The protrusion part 2511 of the push hook 25 locks into the locking unit 310 (shown in FIG. 5) in such a manner by fitting to a locking jaw 3112 (shown in FIG. 5) formed in a housing 311 (shown in FIG. 5) of the locking unit 310 of FIG. 5, thereby being capable of leading and clamping the push hook 25 to the locking unit 310. This manner of fitting is described with reference to FIG. 5.

The screw bushing 253 is formed to have a free space 2531 even when the screw 252 is fully clamped to the screw bushing 253. This free space 2531 provides a tolerance to accommodate different lengths of the screw 252, thereby preventing the protective cover 20 from being damaged, unfastened, or deformed due to screw clamping.

A portion of the protrusion part 2511 locked with the locking unit 310 is formed in a curved shape bent at a certain curvature, thereby preventing abrasion resulting from a fitting operation. For example, the protrusion part 2511 may have a radius of curvature 0.3 Radius (R).

According to an embodiment, the push hook 25 is formed of materials which are not easily abraded. For example, the push hook 25 may be formed of Poly-Oxy-Methylene (POM) materials.

Figure 4:
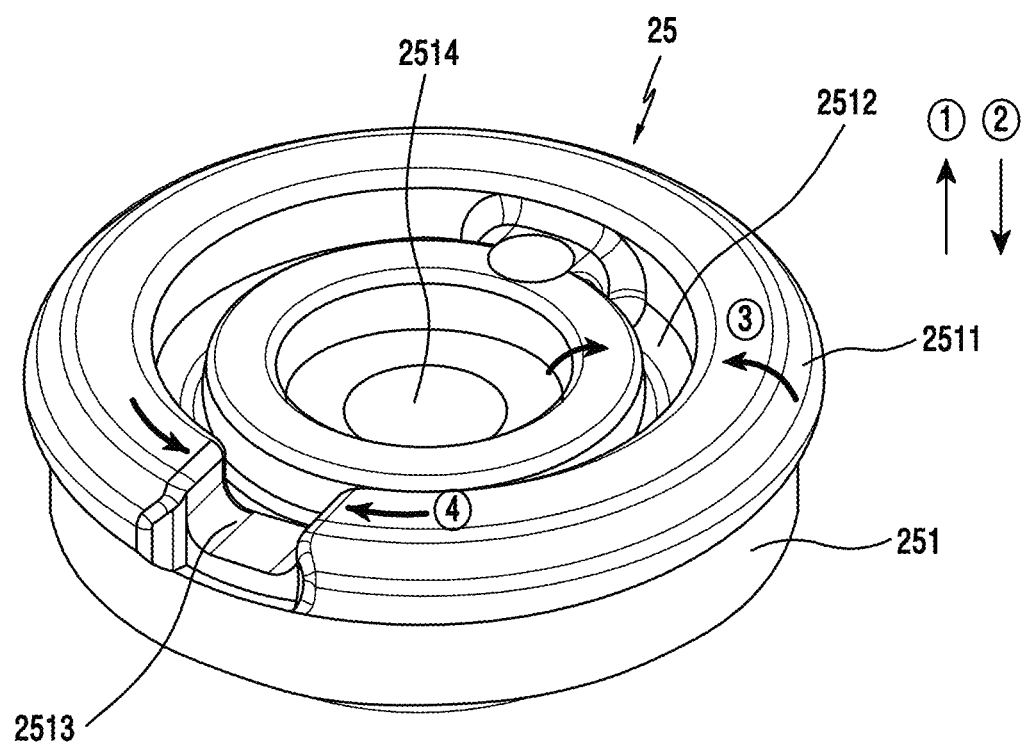
FIG. 4 is a perspective view of a push hook, according to an embodiment of the present invention.

FIG. 4 is a perspective view of a push hook, according to an embodiment of the present invention.

Referring to FIG. 4, the push hook 25 is formed in a circular shape, and the protrusion part 2511 is formed to protrude from the body 251 along a circumference of the push hook 25.

The push hook 25 has a hollow-shape screw clamping hole 2514 at a center and a tension slit 2512 of a certain depth which is formed along the circumference of the push hook 25 between the screw clamping hole 2514 and the protrusion part 2511. The tension slit 2512 and the protrusion part 2511 are formed in concentric circles. If the push hook 25 is fitted to the locking unit 310 (shown in FIG. 5), the tension slit 2512 of the push hook 25 provides a tension, thereby preventing damage to the push hook 25. When the push hook 25 is attached, in direction 1, or detached, in direction 2, from the locking unit 310, the protrusion part 2511 of the push hook 25 performs a buffering action in the direction 3 by virtue of the tension slit 2512, thereby preventing damage and abrasion of the protrusion part 2511.

The protrusion part 2511 may have an opening part 2513. In this case, when the push hook 25 is attached, in direction 1, or detached, in direction 2, from the locking unit 310, the protrusion part 2511 of the push hook 25 performs a buffering action in the direction 4 by virtue of the opening part 2513, thereby preventing damage and abrasion of the protrusion part 2511.

The protrusion part 2511 may also have a plurality of the opening parts 2513 provided at certain intervals along the protrusion part 2511.

As illustrated in FIG. 4, the push hook 25 is formed in a circular shape, but the push hook 25 may also be formed in various other shapes. For example, the push hook 25 may be formed in a polygonal shape, an oval shape, etc.

Figure 5:
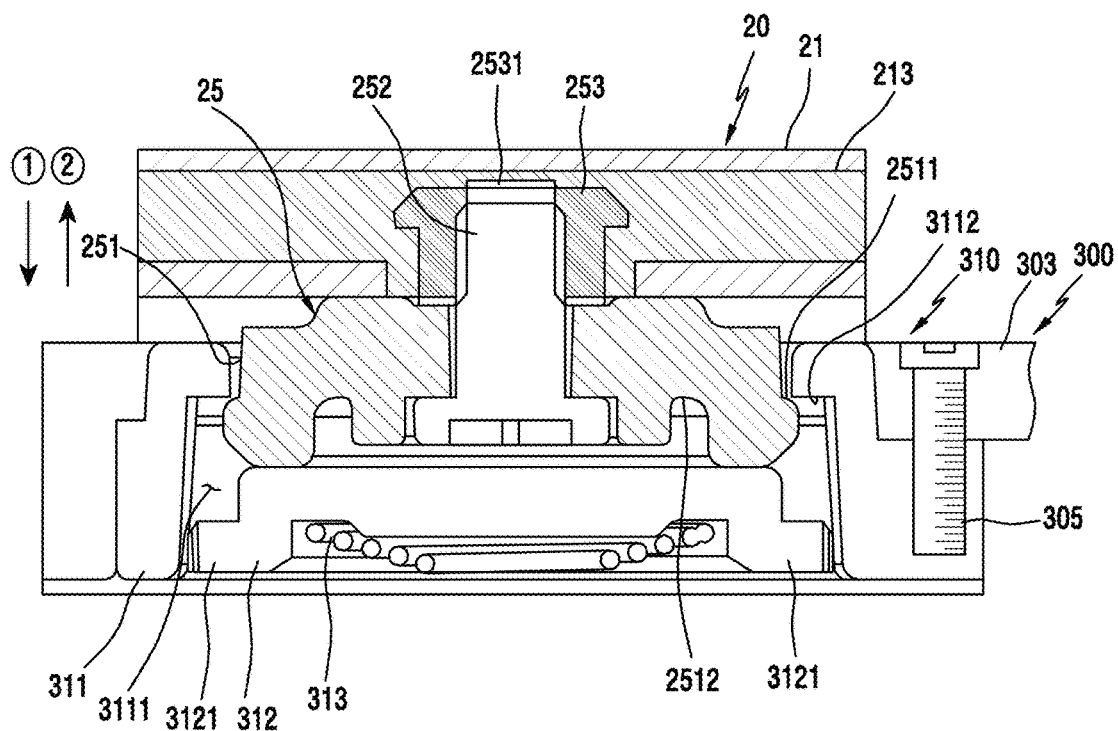
FIG. 5 is a partial cross section view of a push hook of a protective cover coupled with a locking unit arranged on a rear surface of an electronic device, according to an embodiment of the present invention.

FIG. 5 is a partial cross section view of a push hook of a protective cover coupled with a locking unit arranged on a rear surface of an electronic device, according to an embodiment of the present invention.

Referring to FIG. 5, a push hook 25 coupled with a locking unit 310 is provided. The construction of the push hook 25 is the same as the aforementioned constructions of FIG. 3A to FIG. 4 and, thus, its description is omitted.

Referring to FIG. 5, the locking unit 310 is arranged on the rear surface of the electronic device 300 in a position corresponding to the push hook 25 of the protective cover 20. The locking unit 310 includes the housing 311, a push button 312, and an elastic member 313.

The housing 311 has a button housing space 3111. The push button 312 is configured to be rotatable in a vertical direction within the housing 311 and to prevent the release of the push button 312 by virtue of the locking jaw 3112 of the housing 311. The elastic member 313 provides a constant pressure on the push button 312 in the direction of an outer side of the electronic device 300.

The push button 312 has a flange 3121 extending and formed along an edge of the push button 312. The flange 3121 locks to the locking jaw 3112, thereby preventing the release of the push button 312. When the push button 312 is not combined with the push hook 25 (e.g., when the electronic device 300 is used without the protective cover 20, or when the protective cover 20 is in an open position), the push button 312 is positioned in a manner that an upper surface of the push button 312 is level with an outer surface of the electronic device 300 due to the pressure provided by the elastic means 313. But, as illustrated in FIG. 5, if the push hook 25 pressurizes the push button 312, the push button 312 is depressed such that the push hook 25 is housed within the housing 311.

The components of the locking unit 310 are housed within the housing 311, and are arranged in such a manner of exposing an upper surface of the push button 312 to be level with an external surface of the electronic device 300. The housing 311 is clamped to a bracket 303 of metal materials of the electronic device 300 due to at least one screw 305. However, the housing 311 may alternatively be fixed to an inner side of a case frame of the electronic device 300.

The elastic member 313 may be, for example, a coil spring. The coil spring may be a conical coil spring to minimize a volume upon compression. However, various springs such as a leaf spring, a torsion spring, etc. may be used as well.

If the electronic device 300 is coupled to the first cover member 21 of the protective cover 20, the push hook 25 of the protective cover 20 provides pressure in direction 1, shown in FIG. 5. In this case, the push hook 25 depresses the push button 312 and is inserted into the internal space 3111 of the housing 311 of the locking unit 310. In this case, the protrusion part 2511 of the push hook 25 is locked to the locking jaw 3112 of the housing 311, whereby coupling is completed.

When the protective cover 20 is to be detached from the electronic device 300 (i.e., if the protective cover 20 is pulled in direction 2, shown in FIG. 5) upon sufficient force being applied, the first cover member 21 is detached from the electronic device 300. In this case, the protrusion part 2511 of the push hook 25 is uncoupled from the locking jaw 3112 of the housing 311, and the push button 312 is restored to the original position (i.e., the position in which the upper surface of the push button is level with the outer surface of the electronic device) by means of the elastic member 313.

Figure 6A:
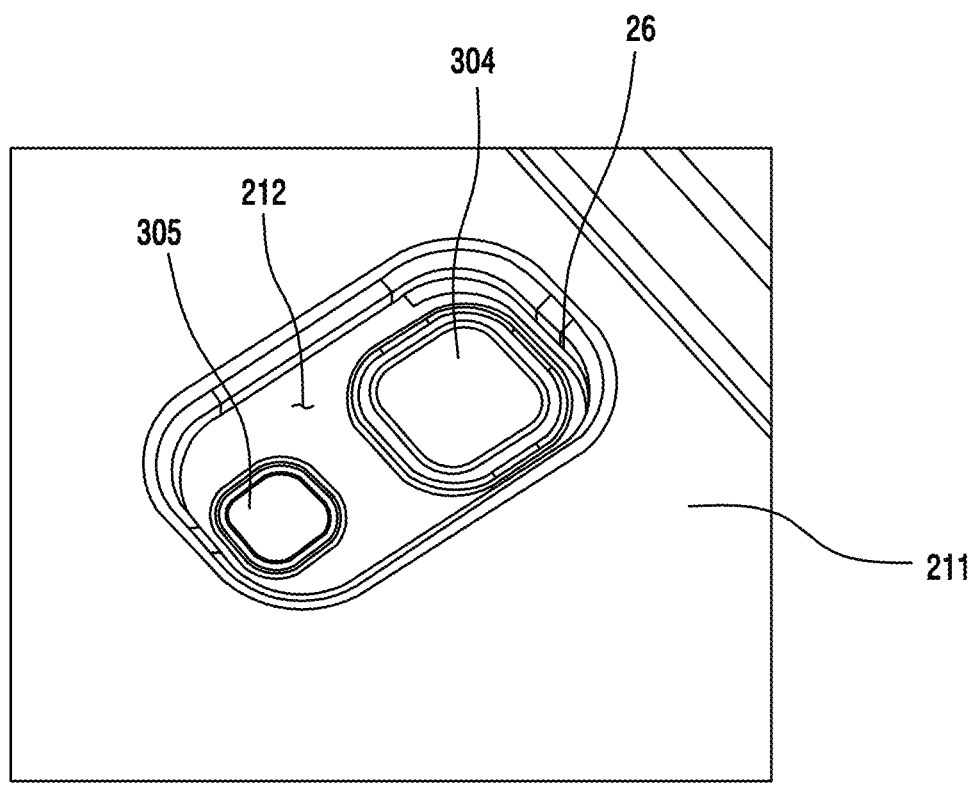
FIG. 6A and FIG. 6B are diagrams illustrating a decoration member of a protective cover, according to an embodiment of the present invention.
Figure 6B:
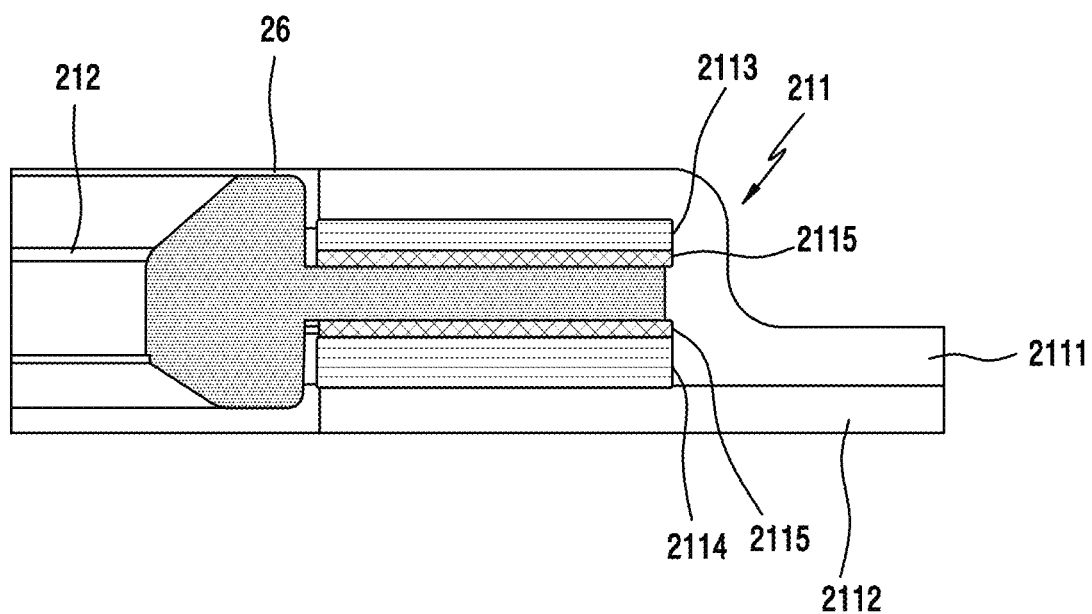

FIG. 6A and FIG. 6B are diagrams illustrating a decoration member of a protective cover, according to an embodiment of the present invention.

Referring to FIG. 6A, the protective cover 20 may have an opening 212 to expose various electronic components 304 and 305 of the electronic device 300. For example, the electronic components 304 and 305 may be a camera module 304 and a flash module 305 arranged in the rear surface of the electronic device 300, and the opening 212 of the protective cover 20 may be provided in a position corresponding to the camera module 304 and the flash module 305.

The decoration member 26 may also be installed along an edge of the opening 212 of the protective cover 20. This decoration member 26 provides an aesthetic complement to the appearance of the protective cover 20. The decoration member 26 may be of various materials such as synthetic resin, metal, epoxy, etc. A vapor deposition and Ultraviolet (UV) coating may be applied to the decoration member 26 to add a metal feeling to synthetic resin materials, for example. A chromium plating may also be applied to a decoration member 26 composed of synthetic resin materials.

Referring to FIG. 6B, one part of an edge of the decoration member 26 is fixed to the protective cover 20 in such a manner of being built into the protective cover 20. The decoration member 26 is fixed to the protective cover 20 in such a manner that first and second internal members 2113 and 2114 of the protective cover 20 are attached to upper and lower parts of the decoration member 26 by a double sided tape 2115, and first and second external members 2111 and 2112 of the protective cover 20 are attached to the outer surface of the decoration member 26.

The first and second internal members 2113 and 2114 may use epoxy-series materials, and the first and second external members 2111 and 2112 may use leather materials. However, various outer fixing structures may be applied in which the decoration member 26 is manufactured as a separate piece and be fixed to the protective cover 20.

Figure 7:
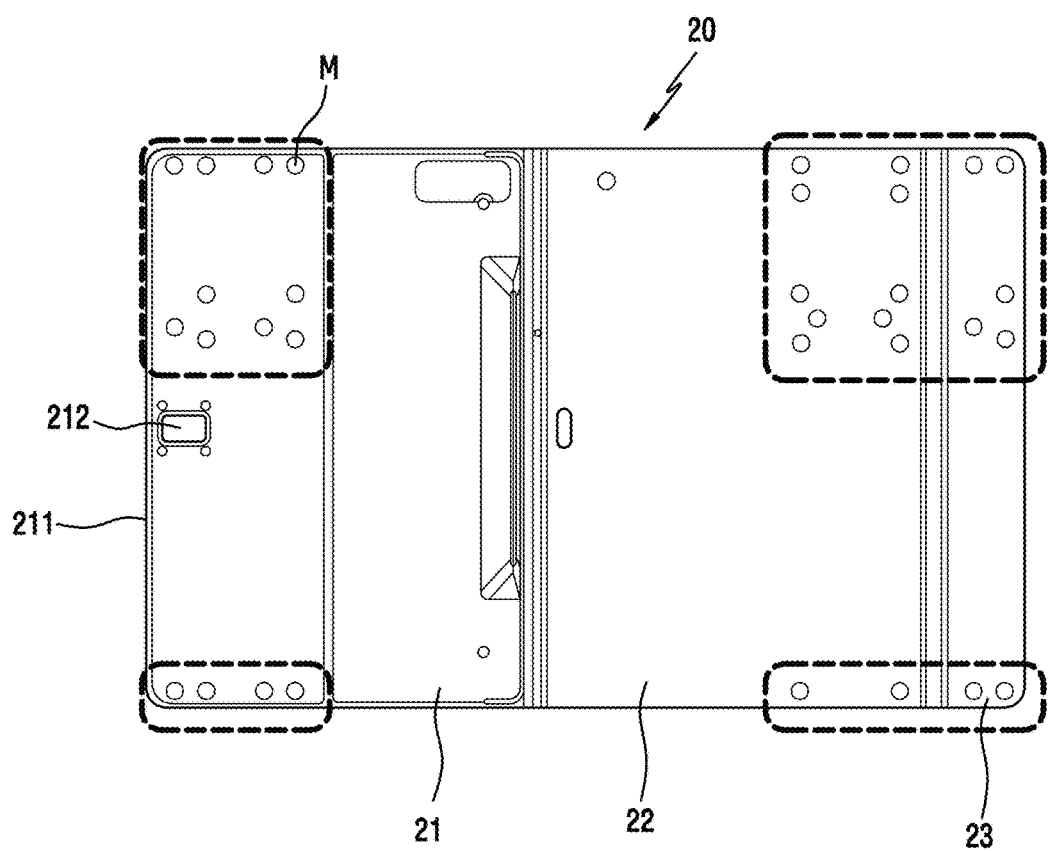
FIG. 7 is a planar view of a protective cover in which a plurality of magnets is arranged, according to an embodiment of the present invention.

FIG. 7 is a planar view of a protective cover in which a plurality of magnets is arranged, according to an embodiment of the present invention.

Referring to FIG. 7, the protective cover 20 including a plurality of magnets M is provided. The magnets M provide a bonding force for maintaining a surface contact of cover members 21, 22, 23, 211, and 221 with one another when the protective cover 20 is folded along the folding lines f1, f2, f3, and f4, as illustrated in FIGS. 2A to 2D. The plurality of magnets M may be arranged in various regions of one or more of the cover members 21, 22, 23, 211, and 221 (e.g., in the regions marked with dotted lines in FIG. 7).

According to various embodiments of the present invention, because a combination structure of a protective cover and an electronic device is arranged in a suitable place of a rear surface of the electronic device the volume or the bulk of the electronic device does not need to be increased to accommodate the cover. Because a snap-fit combination structure using a push hook is applied, the protective cover and the electronic device may be firmly coupled, easy attachment and detachment are possible, and maintenance is simplified. As a result, the combination structure contributes to an improvement in the reliability of the protective cover and the electronic device.

Figure 8:
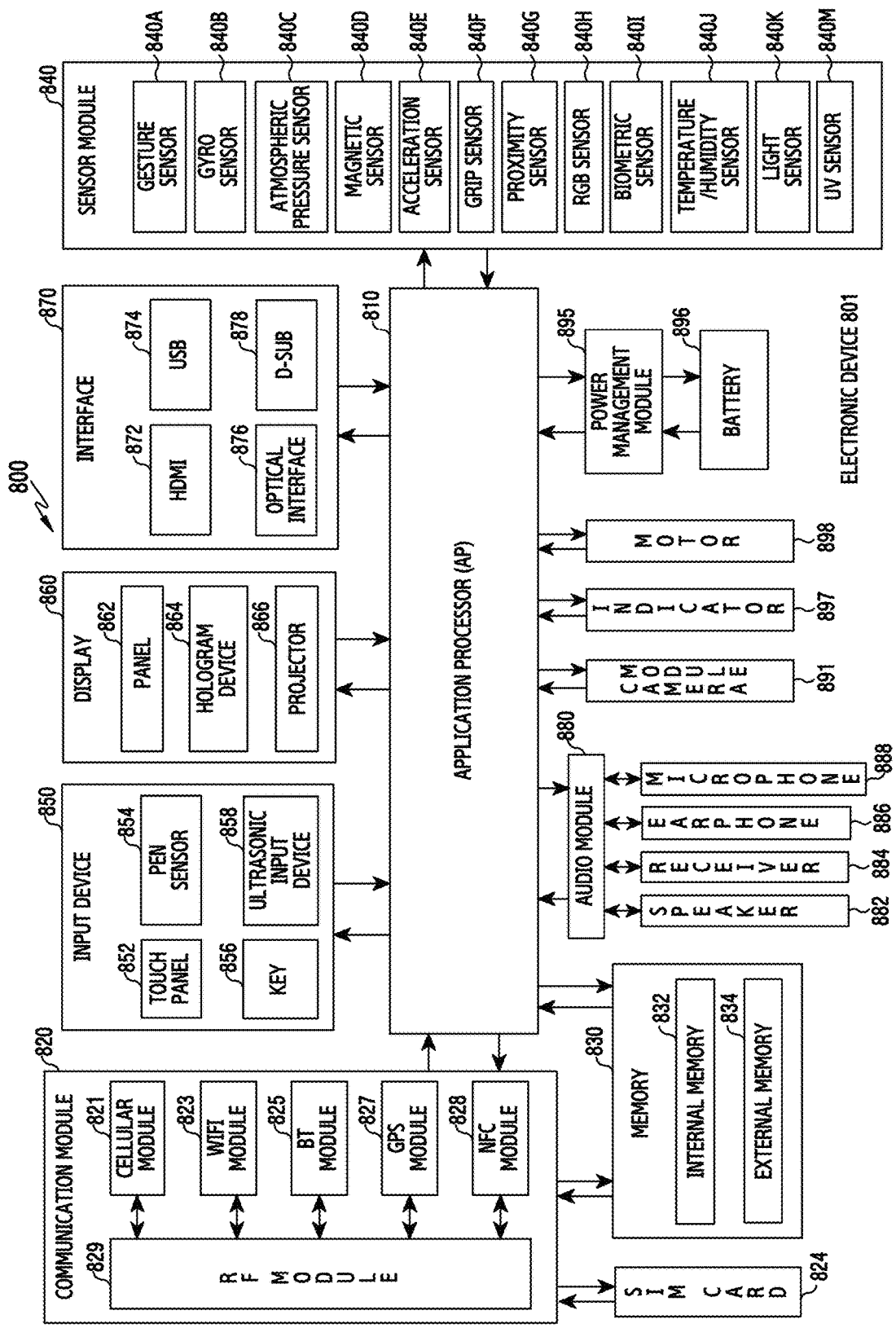
FIG. 8 is a block diagram illustrating a configuration of an electronic device, according to an embodiment of the present invention.

FIG. 8 is a block diagram illustrating a configuration of an electronic device, according to an embodiment of the present invention.

Referring to FIG. 8 a block diagram 800 illustrating a configuration of an electronic device 801, according to an embodiment of the present invention, is provided. The electronic device 801 may entirely or partially constitute, for example, the electronic device 101 of FIG. 1 and the device 300 of FIG. 2B. Electronic device 801 includes at least one Application Processor (AP) 810, a communication module 820, a Subscriber Identification Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 controls a plurality of hardware or software elements connected to the AP 810 by driving an operating system or an application program, and processes a variety of data, including multimedia data, and performs an arithmetic operation. The AP 810 may be implemented, for example, with a System on Chip (SoC). The AP 810 may further include a Graphic Processing Unit (GPU).

The communication module 820 (e.g., the communication interface 160) performs data transmission/reception in communication between other electronic devices (e.g., the electronic device 104 or the server 106) connected with the electronic device 801 (e.g., the electronic device 101) through a network. The communication module 820 includes a cellular module 821, a WiFi module 823, a BlueTooth (BT) module 825, a GPS module 827, an NFC module 828, and a Radio Frequency (RF) module 829.

The cellular module 821 provides a voice call, a video call, a text service, an Internet service, and the like through a communication network (e.g., LTE, LTE-A, CDMA, WCDMA, UMTS, WiBro, GSM, etc.). In addition, the cellular module 821 may identify and authenticate the electronic device within the communication network by using a subscriber identity module (e.g., the SIM card 824). The cellular module 821 may perform at least some of functions that can be provided by the AP 810. For example, the cellular module 821 may perform at least some of multimedia control functions.

The cellular module 821 includes a Communication Processor (CP). Further, the cellular module 821 may be implemented, for example, with an SoC.

Although elements of the electronic device 801, such as the cellular module 821 (e.g., the communication processor), the memory 830, the power management module 895, and the like, are illustrated as separate elements with respect to the AP 810 in FIG. 8, the AP 810 may also be implemented such that at least one part (e.g., the cellular module 821) of the aforementioned elements is included.

The AP 810 or the cellular module 821 (e.g., the communication processor) loads an instruction or data, which is received from each non-volatile memory connected thereto or at least one of the elements of the electronic device 801, to a volatile memory and processes the instruction or data. In addition, the AP 810 or the cellular module 821 stores data, which is received from at least one of the elements or generated by at least one of the elements, in the non-volatile memory.

Each of the WiFi module 823, the BT module 825, the GPS module 827, and the NFC module 828 may include, for example, a processor for processing data transmitted/received through a corresponding module. Although the cellular module 821, the WiFi module 823, the BT module 825, the GPS module 827, and the NFC module 828 are illustrated in FIG. 8 as separate blocks, according to an embodiment, at least some (e.g., two or more) of the cellular module 821, the WiFi module 823, the BT module 825, the GPS module 827, and the NFC module 828 may be included in one Integrated Chip (IC) or IC package. For example, at least some of processors corresponding to the cellular module 821, the WiFi module 823, the BT module 825, the GPS module 827, and the NFC module 828 (e.g., a communication processor corresponding to the cellular module 821 and a WiFi processor corresponding to the WiFi module 823) may be implemented with an SoC.

The RF module 829 transmits/receives data, for example, an RF signal. The RF module 829 may include, for example, a transceiver, a Power Amp Module (PAM), a frequency filter, a Low Noise Amplifier (LNA), etc. In addition, the RF module 829 may further include a component for transmitting/receiving a radio wave on a free air space in wireless communication, for example, a conductor, a conducting wire, and the like. Although it is illustrated in FIG. 8 that the cellular module 821, the WiFi module 823, the BT module 825, the GPS module 827, and the NFC module 828 share one RF module 829, according to one exemplary embodiment, at least one of the cellular module 821, the WiFi module 823, the BT module 825, the GPS module 827, the NFC module 828 may transmit/receive an RF signal via a separate RF module.

The SIM card 824 is a card that may be inserted into a slot formed at a specific location of the electronic device 801. The SIM card 824 includes unique identification information (e.g., an Integrated Circuit Card IDentifier (ICCID)) or subscriber information (e.g., an International Mobile Subscriber Identity (IMSI)).

The memory 830 (e.g., the memory 130) may include an internal memory 832 or an external memory 834.

The internal memory 832 may include, for example, at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). The internal memory 832 may be a Solid State Drive (SSD).

The external memory 834 may further include a flash drive, and may further include, for example, Compact Flash (CF), Secure Digital (SD), Micro Secure Digital (Micro-SD), Mini Secure digital (Mini-SD), extreme Digital (xD), memory stick, and the like. The external memory 834 may be operatively coupled to the electronic device 801 via various interfaces. The electronic device 801 may further include a storage unit (or a storage medium) such as a hard drive.

The sensor module 840 measures a physical quantity or detects an operational state of the electronic device 801, and converts the measured or detected information into an electric signal. The sensor module 840 includes, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (e.g., a Red, Green, Blue (RGB) sensor), a biometric sensor 840I, a temperature/humidity sensor 840J, an illumination (light) sensor 840K, and an Ultra Violet (UV) sensor 840M. Additionally or alternatively, the sensor module 840 may include, for example, an E-node sensor, an ElectroMyoGraphy (EMG) sensor, an ElectroEncephaloGram (EEG) sensor, an ElectroCardioGram (ECG) sensor, a fingerprint sensor, etc. The sensor module 840 may further include a control circuit for controlling at least one or more sensors included therein.

The input module 850 includes a touch panel 852, a (digital) pen sensor 854, a key 856, or an ultrasonic input unit 858.

The touch panel 852 recognizes a touch input by using at least one of an electrostatic type, a pressure-sensitive type, and an ultrasonic type. The touch panel 852 may further include a control circuit. In the case of the electrostatic type, not only a physical contact, but proximity recognition is also possible. The touch penal 852 may further include a tactile layer. In this case, the touch panel 852 provides the user with a tactile reaction.

The (digital) pen sensor 854 may be implemented by using the same or a similar method of receiving a touch input of the user or by using an additional sheet for recognition.

The key 856 may be a physical button, an optical key, a keypad, or a touch key.

The ultrasonic input unit 858 detects a sound wave through a microphone (e.g., a microphone 888) by using a pen which generates an ultrasonic signal, and is capable of radio recognition.

The electronic device 801 may use the communication module 820 to receive a user input from an external device (e.g., a computer or a server) connected thereto.

The display 860 (e.g., the display 150) may include a panel 862, a hologram device 864, or a projector 866.

The panel 862 may be, for example, a Liquid-Crystal Display (LCD), an Active-Matrix Organic Light-Emitting Diode (AM-OLED), etc. The panel 862 may be implemented, for example, in a flexible, transparent, or wearable manner. The panel 862 may be constructed as one module with the touch panel 852.

The hologram device 864 uses an interference of light to display a stereoscopic image in the air.

The projector 866 displays an image by projecting a light beam onto a screen. The screen may be located, for example, inside or outside the electronic device 801.

The display 860 may further include a control circuit for controlling the panel 862, the hologram 864, and the projector 866.

The interface 870 may include a High-Definition Multimedia Interface (HDMI) 872, a Universal Serial Bus (USB) 874, an optical interface 876, or a D-subminiature (D-sub) 878. The interface 870 may be included, for example, in the communication interface 160 of FIG. 1. Additionally or alternatively, the interface 870 may include, for example, Mobile High-definition Link (MHL), Secure Digital (SD)/Multi-Media Card (MMC) or Infrared Data Association (IrDA).

The audio module 880 bilaterally converts a sound and an electric signal. At least some elements of the audio module 808 may be included in, for example, the input/output interface 140 of FIG. 1. The audio module 880 converts sound information which is input or output, for example, through a speaker 882, a receiver 884, an earphone 886, or the microphone 888.

The camera module 891 is a device for image and video capturing, and may include one or more image sensors (e.g., a front sensor or a rear sensor), a lens, an Image Signal Processor (ISP), and a flash (e.g., LED or xenon lamp).

The power management module 895 manages power of the electronic device 801. The power management module 895 may include, for example, a Power Management Integrated Circuit (PMIC), a charger Integrated Circuit (IC), or a battery gauge.

The PMIC may be placed, for example, inside an IC or SoC semiconductor. Charging may be classified into wired charging and wireless charging.

The charger IC charges a battery, and avoids an over-voltage or over-current flow from a charger. The charger IC may further include a charger IC for at least one of the wired charging and the wireless charging. The wireless charging may be classified, for example, into a magnetic resonance type, a magnetic induction type, and an electromagnetic type. An additional circuit for the wireless charging, for example, a coil loop, a resonant circuit, a rectifier, etc., may be added.

The battery gauge measures a residual quantity of the battery 896 and a voltage, current, and temperature during charging. The battery 896 stores or generates electricity and supplies power to the electronic device 801 by using the stored or generated electricity. For example, the battery 896 may include a rechargeable battery or a solar battery.

The indicator 897 displays a specific state, for example, a booting state, a message state, a charging state, etc., of the electronic device 801 or a part thereof (e.g., the AP 810).

The motor 898 converts an electric signal into a mechanical vibration.

The electronic device 801 may include a processing unit (e.g., a GPU) for supporting mobile TV. The processing unit for supporting mobile TV processes media data according to a protocol of, for example, Digital Multimedia Broadcasting (DMB), Digital Video Broadcasting (DVB), media flow, etc.

Each of the aforementioned elements of the electronic device, according to various embodiments of the present invention, may consist of one or more components, and names thereof may vary depending on a type of the electronic device. The electronic device, according to various embodiments of the present invention, may include at least one of the aforementioned elements. Some of the elements may be omitted, or additional other elements may be further included. In addition, some of the elements of the electronic device according to various embodiments of the present invention may be combined and constructed as one entity, so as to equally perform functions of corresponding elements before combination.

A term "module", as herein, may imply a unit including, for example, one of hardware, software, and firmware or a combination of two or more of them. The term "module" may be interchangeably used with a term such as unit, logic, logical block, component, circuit, etc. The "module" may be a minimum unit of an integrated component or may be a part thereof. The "module" may be a minimum unit for performing one or more functions or may be a part thereof. The "module" may be mechanically or electrically implemented. For example, the "module" may include at least one of an Application-Specific Integrated Circuit (ASIC) chip, a Field-Programmable Gate Arrays (FPGAs), and a programmable-logic device, which are known or will be developed and which perform certain operations.

According to various embodiments, at least some parts of a device (e.g., modules or functions thereof) or method (e.g., operations) may be implemented with an instruction stored in a computer-readable storage media, for example. If the instruction is executed by one or more processors (e.g., the processor 810), the one or more processors perform a function corresponding to the instruction. The computer-readable storage media may be, for example, the memory 830. At least some parts of the programming module may be implemented (e.g., executed) by the processor 810. At least some parts of the programming module may include modules, programs, routines, sets of instructions, processes, etc., for performing one or more functions.

The computer-readable recording medium may be a hardware device configured to store and perform a program instruction (e.g., program module) for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler, but also a high-level language executable by a computer by using an interpreter or the like. The aforementioned hardware device may be configured to operate as one or more software modules to perform the operation of the present disclosure, and vice versa.

The module or programming module, according to various embodiments of the present invention, may further include at least one or more elements from among the aforementioned elements, may omit some of them, or may further include additional other elements. Operations performed by a module, programming module, or other elements may be executed in a sequential, parallel, repetitive, or heuristic manner. In addition, some of the operations may be executed in a different order or may be omitted, or other operations may be added.

While the present invention has been shown and described with reference to various embodiments, it will be understood by those skilled in the art that various changes in form and details may be made therein without departing from the spirit and scope of the present invention. Therefore, the scope of the present invention is defined not by the detailed description of the present invention, but by the appended claims and their equivalents, and thus, all differences within the scope will be construed as being included in the present invention.

What is claimed is:

1. An electronic device comprising:
    a protective cover configured to protect at least a partial region of the electronic device,
    wherein the protective cover is detachably connectable with the electronic device by a snap-fit structure provided on at least one portion in surface contact with the electronic device,
    wherein at least one push hook protrudes from an inner surface of the protective cover that is in contact with the electronic device, the at least one push hook being configured such that at least one part of the at least one push hook fits into a locking jaw of a locker unit formed at a corresponding position of the electronic device,
    wherein the at least one push hook is formed in a circular shape, and has a protrusion part formed along a circumference of the at least one push hook and locked into the locking jaw of the locker unit,
    wherein the at least one push hook includes a tension slit having a concentric circle with the protrusion part, and due to a buffering action of the tension slit, prevents the protrusion part from being abraded and deformed during a snap-fit operation, and
    wherein the at least one push hook includes at least one opening part provided in the protrusion part in a radial direction, and due to a buffering action of the at least one opening part, prevents the protrusion part from being abraded and deformed during the snap-fit operation,
    wherein the locker unit comprises:
        a housing comprising a button housing space arranged in a portion of the electronic device corresponding to a position of the at least one push hook;
        a push button flexibly arranged in the button housing space of the housing; and
        an elastic member providing pressure on the push button towards an outer side of the electronic device.

2. The electronic device of claim 1, wherein the at least one push hook is attached to the protective cover by a screw.

3. The electronic device of claim 2, wherein the at least one push hook includes a screw hole, and is fixed in such a manner that the screw attaches the at least one push hook to the protective cover after passing through the screw hole.

4. The electronic device of claim 2, wherein the protective cover comprises at least one rigid member, and the screw attaches the at least one push hook to the at least one rigid member through a screw bushing insert molded to the at least one rigid member.

5. The electronic device of claim 4, wherein the screw bushing is formed of metal materials.

6. The electronic device of claim 1, wherein a portion of the protrusion part locked with the locking jaw of the locker unit is formed in a curved shape having a certain curvature radius to prevent abrasion caused by friction.

7. The electronic device of claim 1, wherein, when the at least one push hook is not applied to the locker unit, the elastic member provides pressure to the push button towards a position in which an upper surface of the push button is level with an outer surface of the electronic device.

8. The electronic device of claim 1, wherein the locking jaw is formed in the housing.

9. The electronic device of claim 1, wherein the housing is arranged in such a manner that an upper surface of the push button is exposed to the outside of the electronic device.

10. The electronic device of claim 1, wherein the elastic member comprises a conical coil spring for pressurizing the push button in a direction of the outer side of the electronic device.

11. A protective cover for an electronic device, comprising:
    at least one cover member,
    wherein the protective cover is detachably connected to the electronic device to protect at least a partial region of the electronic device, the protective cover being connected to the at least a partial region of the electronic device by a snap-fit structure, such that at least one portion of the at least one cover member is in surface contact with the electronic device,
    wherein at least one push hook protrudes from an inner surface of the protective cover that is in contact with the electronic device, the at least one push hook being configured such that at least one part of the push hook fits into a locking jaw of a locker unit formed at a corresponding position of the electronic device,
    wherein the at least one push hook is formed in a circular shape, and has a protrusion part formed along a circumference of the at least one push hook and locked into the locking jaw of the locker unit,
    wherein the at least one push hook includes a tension slit having a concentric circle with the protrusion part, and due to a buffering action of the tension slit, prevents the protrusion part from being abraded and deformed during a snap-fit operation, and
    wherein the at least one push hook includes at least one opening part provided in the protrusion part in a radial direction, and due to a buffering action of the at least one opening part, prevents the protrusion part from being abraded and deformed during the snap-fit operation,
    wherein the locker unit comprises:
        a housing comprising a button housing space arranged in a portion of the electronic device corresponding to a position of the at least one push hook;
        a push button flexibly arranged in the button housing space of the housing; and an elastic member providing pressure on the push button towards an outer side of the electronic device.

12. The protective cover of claim 11, wherein the at least one push hook includes a screw hole, and is fixed to the protective cover in such a manner that a screw attaches the at least one push hook to the protective cover after passing through the screw hole of the push hook.

13. The protective cover of claim 12, wherein the protective cover includes at least one rigid member, and the screw attaches the at least one push hook to the at least one rigid member through a screw bushing insert molded to the at least one rigid member of the protective cover.

14. An electronic device having a detachable protective cover, the electronic device comprising:
   a push hook protruding from at least one portion of the protective cover; and
   a locker unit arranged on the electronic device at a position corresponding to the push hook in surface contact with the protective cover, the locker unit housing a protrusion part of the push hook by a snap-fit structure,
   wherein the protective cover comprises at least one rigid member, and the push hook comprises a screw hole, and is fixed in a manner that a screw attaches the push hook to the at least one rigid member through a screw bushing insert molded to the at least one rigid member after passing through the screw hole,
   wherein the locker unit comprises:
      a housing comprising a button housing space arranged in a portion of the electronic device at a position corresponding to the push hook;
      a push button flexibly arranged in the button housing space of the housing; and
      an elastic member providing pressure on the push button towards an outer side of the electronic device, and
   wherein the protrusion part of the push hook is located in a space of the housing under pressure applied by the push button and locked to a locking jaw of the housing,
   wherein the push hook includes a tension slit having a concentric circle with the protrusion part, and due to a buffering action of the tension slit, prevents the protrusion part from being abraded and deformed during a snap-fit operation, and
   wherein the push hook includes at least one opening part provided in the protrusion part in a radial direction, and due to a buffering action of the at least one opening part, prevents the protrusion part from being abraded and deformed during the snap-fit operation,
   wherein the locker unit comprises:
      a housing comprising a button housing space arranged in a portion of the electronic device corresponding to a position of the at least one push hook;
      a push button flexibly arranged in the button housing space of the housing; and
   an elastic member providing pressure on the push button towards an outer side of the electronic device.

* * * * *